Patented June 10, 1924.

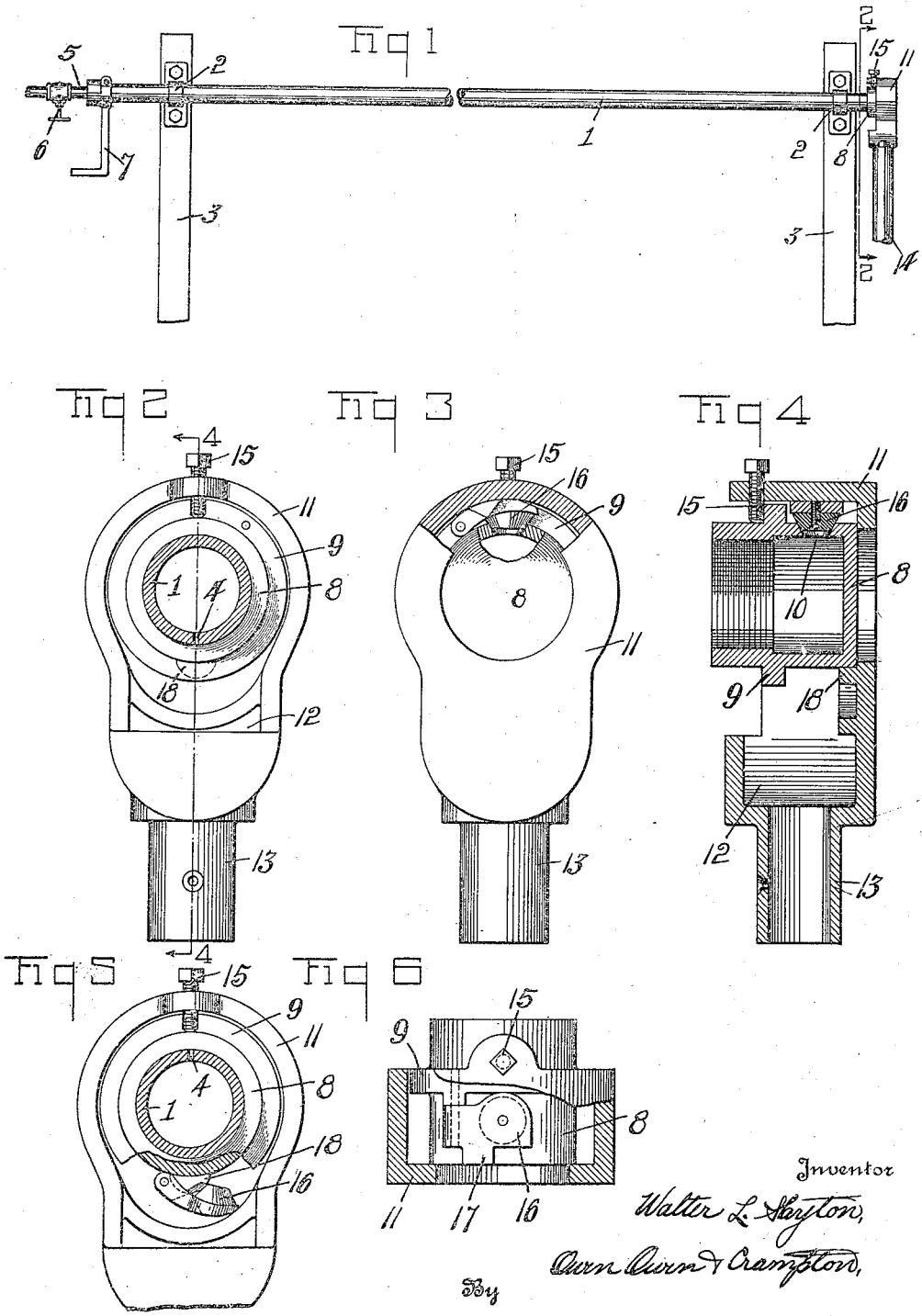

1,497,037

UNITED STATES PATENT OFFICE.

WALTER L. SLAYTON, OF TOLEDO, OHIO.

AUTOMATIC DRAINAGE MEANS FOR PIPE.

Application filed December 7, 1923. Serial No. 679,168.

*To all whom it may concern:*

Be it known that I, WALTER L. SLAYTON, a citizen of the United States, and a resident of Toledo, in the county of Lucas and State of Ohio, have invented a new and useful Automatic Drainage Means for Pipe, which invention is fully set forth in the following specification.

This invention relates particularly to sprinkling systems of the type commonly used in green-houses, and has special reference to a draining means for such systems.

In greenhouses it is customary to provide long water distributing pipes in elevated position lengthwise of the beds to be watered and to provide these pipes at intervals with laterally directing discharge orifices along one side thereof whereby a multiplicity of small streams of water may be discharged radially from each pipe in spaced order longitudinally thereof. These pipes are usually arranged lengthwise of the beds and are mounted for turning movements on their supports to enable the direction of projection of the streams to be varied as may be desired to water different portions of the bed. It is desirable to drain the pipes after using, and for this purpose a drain-cock is customarily provided at the opposite end of the pipe to the supply control valve, thereby necessitating the attendant, after closing a supply valve, to walk to the other end of the pipe, which may be of considerable length, and open the drain-cock.

The primary object of the invention is the provision, in combination with a pipe of the character described, of a drain valve which is automatically operable to open and permit a drainage of the line when the pipe is in a predetermined portion of its movement and to close when the pipe is in a different predetermined portion of such movement.

The invention is fully described in the following specification, and while in its broader aspect it is capable of embodiment in numerous forms, a preferred embodiment thereof is illustrated in the accompanying drawing, in which, Fig. 1 is a side elevation of a portion of a sprinkler system embodying the invention with parts broken away. Fig. 2 is an enlarged section on the line 2—2 in Fig. 1. Fig. 3 is an enlarged outer end elevation of the drainage means embodying the invention, with a part broken away and with the drainage valve shown in closed position. Fig. 4 is a section on the line 4—4 in Fig. 2 with the sprinkling pipe removed. Fig. 5 is a fragmentary view similar to Fig. 2, with the valve in open position, and Fig. 6 is a top view of the part shown in Fig. 3, with the casing partly broken away.

Referring to the drawings, 1 designates a sprinkling pipe of any desired length, which is mounted for turning movements in brackets 2 carried by supporting posts or members 3. The pipe 1 is provided along one side thereof with a row of discharge orifices 4, which are suitably spaced lengthwise of the pipe and adapted to direct streams of water laterally from the pipe. The pipe 1 connects at one end, through a suitable joint or stuffing box, with a supply pipe 5, having a control valve 6 therein, and the pipe 1 is provided at such end with a crank arm or handle 7 to facilitate a turning thereof.

The pipe 1 is usually mounted on a slight incline, so as to drain towards the opposite end of the pipe from the supply line, and such end of the pipe is closed, in the present instance, by a cap 8 threaded thereon and having its outer end portion projecting beyond the pipe end. This cap is provided with an annular flange 9 in spaced relation to its outer end and is provided in a side thereof at the outer side of such flange with a drainage opening 10. This opening is preferably located at the opposite side of the pipe to the drainage orifices 4.

A casing 11 loosely encircles the cap 8 to permit the latter to have free turning movements therein, and the lower portion of the casing forms a receptacle 12 for receiving drainage from the discharge opening 10 when the pipe is turned so as to dispose such drainage opening at the lower side thereof. A drainage nipple 13 extends downward from the bottom of the casing in communication at its upper end with the receptacle 12 and is adapted to fit into a drainage pipe 14 which directs the drainage to any suitable point of discharge. The inner side of the casing 11 is open above the receptacle 12 to permit the insertion of the cap therein. A screw 15 is threaded through the upper inner edge portion of the casing 11 and engages a side of the flange 9 to retain the casing in enclosing relation to the drainage cap 8.

A valve 16 in the present instance of conical form is hinged to the cap 8 at one side of the opening 10 and adapted to seat in such opening to close the same. When the cap 8 is turned to place the drainage opening at the lower side thereof, the valve 16 opens by gravity, permitting drainage from the pipe, and when the cap is turned sufficiently for the valve 16 to be engaged by the side and top walls of the casing 11, the valve is positively seated to close the drainage opening, as shown in Figs. 3 and 4, and is retained seated until again moved to drainage position. In order to prevent any possibility of the valve sticking and remaining closed when moved to drainage position, it is provided at one side thereof with a projection 17, which coacts with a cam projection 18 on the inner end of the casing 11, and the valve is thereby caused to be positively opened when the cap is turned to place the opening 10 therein in draining position.

In the use of a sprinkling system embodying my invention, the attendant turns the pipe 1 to the position in which it is desired to discharge the streams of water therefrom, in which position the valve is closed by reason of its engagement with the side of the casing 11, and the supply valve 6 is then opened. The location of the drainage discharge orifices 4 and the drainage opening at opposite sides of the pipe axis, and the relation of the enveloping side portion of the casing 11 to the cap 8, makes it possible to turn the pipe 1 through a wide range of adjustment without opening the drainage valve 16. When the supply of water to the sprinkling pipe 1 is turned off, the pipe is turned to place the discharge orifices 4 thereof at the upper side of the pipe, as shown in Fig. 5, so that drainage cannot take place therefrom and at the same time the discharge orifice 10 in the cap 8 is turned to drainage position and the valve 16 opens either by gravity or by reason of the engagement of the projection 17 thereon with the casing projection 18. Drainage then takes place into the lower portion of the casing 11 and therefrom through the nipple 13 and discharge pipe 14.

I wish it understood that my invention is not limited to any specific form herein described, as it is capable of numerous modifications without departing from the spirit of the invention.

Having thus described my invention, what I claim as new, and desire to secure by Letters Patent, is:

1. In combination, a rotatably mounted pipe having a drainage opening in a side thereof, a valve carried by the pipe and adapted to close said opening, and means for coacting with the valve to move it to closed position and to maintain it in such position during a predetermined portion of a turning movement of the pipe and to permit an opening of the valve during a different predetermined portion of turning movement of the pipe.

2. In combination, a rotatably mounted pipe having its axis disposed at an angle to a vertical and having an opening in a side thereof, an outwardly closing valve for closing said opening, and means coacting with the valve to retain it closed during a predetermined portion of a turning movement of the pipe and acting on the valve to effect an opening thereof during a different predetermined portion of a rotation of the pipe.

3. In combination, a pipe mounted for turning movements and having a discharge orifice in one side thereof and a drainage opening in the opposite side thereof, an outwardly opening valve for closing said opening, and means coacting with the valve to retain it closed during a predetermined portion of a rotation of the pipe and permitting an opening of the valve during a different predetermined portion of a rotation of the pipe.

4. In combination, a pipe mounted for turning movements and having its axis disposed at an angle to a vertical, said pipe having a discharge orifice in one side thereof and a drainage opening in its opposite side, a valve for closing the drainage opening, and a casing surrounding the portion of the pipe including the drainage opening and forming means for receiving drainage from the opening and also coacting with the valve to maintain it closed during a predetermined portion of a turning movement of the pipe and permitting an opening of the valve during a different predetermined portion of movement of the pipe.

5. In combination, a pipe mounted for turning movements and having discharge orifices in one side thereof, a cap closing one end of the pipe and having a side drainage opening angularly spaced from the discharge orifices of the pipe, a valve attached to the cap for turning movements therewith and adapted to close the drainage opening, a casing encircling said cap and acting on the valve to retain it closed during a predetermined portion of a turning movement of the cap, and to permit an opening thereof during a different predetermined portion of such turning movement.

6. In combination, a pipe mounted for turning movements and having discharge orifices in one side thereof, a cap closing one end of the pipe and having a side drainage opening angularly spaced from the discharge orifices of the pipe, a valve attached to the cap for turning movements therewith and adapted to close the drainage opening, a casing encircling said cap and acting on the valve to retain it closed during a predetermined portion of a turning movement of the cap and to permit an opening thereof during a different portion of such turning movement, said casing having a part for coacting with the valve to effect a positive opening thereof when the cap is turned to draining position.

In testimony whereof I have hereunto signed my name to this specification.

WALTER L. SLAYTON.